(12) United States Patent
Ergen et al.

(10) Patent No.: US 11,503,478 B2
(45) Date of Patent: Nov. 15, 2022

(54) METHOD AND SYSTEM FOR MANAGING A PLURALITY OF WI-FI ACCESS POINTS USING A CLOUD BASED ADAPTIVE SOFTWARE DEFINED NETWORK

(71) Applicant: Ambeent Wireless Bilişim ve Yazilim A.Ş, Istanbul (TR)

(72) Inventors: Mustafa Ergen, Istanbul (TR); Hasan Şildir, Istanbul (TR); Sinem Çöleri Ergen, Istanbul (TR)

(73) Assignee: Ambeent Inc., Istanbul (TR)

( * ) Notice: Subject to any disclaimer, the term of this patent is extended or adjusted under 35 U.S.C. 154(b) by 0 days.

(21) Appl. No.: 15/854,727

(22) Filed: Dec. 26, 2017

(65) Prior Publication Data

US 2022/0191713 A1 Jun. 16, 2022

Related U.S. Application Data

(60) Provisional application No. 62/498,377, filed on Dec. 27, 2016.

(51) Int. Cl.
*H04W 24/02* (2009.01)
*H04L 41/16* (2022.01)
*H04B 17/318* (2015.01)
*H04W 88/08* (2009.01)
*H04W 84/12* (2009.01)

(52) U.S. Cl.
CPC ............ *H04W 24/02* (2013.01); *H04L 41/16* (2013.01); *H04B 17/318* (2015.01); *H04W 84/12* (2013.01); *H04W 88/08* (2013.01)

(58) Field of Classification Search
CPC ..... H04W 24/02; H04W 84/12; H04W 88/08; H04L 41/16; H04B 17/318
See application file for complete search history.

(56) References Cited

U.S. PATENT DOCUMENTS

| 10,230,609 B2 * | 3/2019 | Chandrasekaran ..... H04L 47/28 |
| 2016/0205697 A1 * | 7/2016 | Tan ........................ H04W 24/02 370/329 |
| 2016/0338075 A1 * | 11/2016 | McKibben ............ H04W 16/02 |
| 2017/0272317 A1 * | 9/2017 | Singla ..................... H04L 67/02 |

* cited by examiner

*Primary Examiner* — Mohammad S Anwar
(74) *Attorney, Agent, or Firm* — Mark Farrell; Farrell Patent Law PC

(57) ABSTRACT

The invention provides a method and system for managing a plurality of Wi-Fi access points using a cloud based adaptive software defined network (A-SDN). In order to manage the plurality of Wi-Fi access points, measurement data corresponding to a plurality of network variables are collected from one or more Wi-Fi access points and one or more client devices using a cloud based network application. Once the measurement data are collected, one or more optimal settings of one or more decision variables are derived for the one or more Wi-Fi access points using one or more network variables from the plurality of network variables. The one or more optimal settings are derived by formulation of optimization problems through heuristic solutions and a machine learning based optimization using the one or more network variables.

18 Claims, 7 Drawing Sheets

METHOD AND SYSTEM FOR MANAGING A PLURALITY OF WI-FI ACCESS POINTS USING A CLOUD BASED ADAPTIVE SOFTWARE DEFINED NETWORK

FIELD OF THE INVENTION

The invention generally relates to automatically managing a plurality of Wi-Fi access points using a cloud platform. More specifically, the invention relates to remotely managing and controlling the Wi-Fi access points using a cloud based adaptive software defined network (A-SDN) that involves a number of optimization paths and adaptive decision making criteria.

BACKGROUND OF THE INVENTION

Wi-Fi networks are formed using one or more Wi-Fi access points that support a connection of multiple wireless devices to a wired connection for access to the Internet. The Wi-Fi networks are growing larger by densely deploying the Wi-Fi access points in places such as, but not limited to, residential spaces, apartments, office buildings and public spaces.

In dense deployments, the current Wi-Fi access points operate in an inefficient manner due to a decentralized managing structure and lack of self-organizing feature. Also, the current Wi-Fi access points suffer from collisions of random access mechanism and uncoordinated structure. Further, communication among elements of current Wi-Fi networks is inefficient due to various factors, such as, but not limited to, limited channel availability, interference among the signals, low adaptive capabilities to network topology changes and excessive battery consumption.

Additionally, existing optimization processes require monitoring of vast amount of data corresponding to network variables associated with the Wi-Fi access points. However, monitoring the network variables having high correlation does not bring additional information to a decision maker for optimizing the Wi-Fi access points.

Therefore, in light of the above, there is a need for a method and system for remotely managing and controlling the Wi-Fi access points using a centralized cloud based structure that allows the Wi-Fi access points to operate at real-time optimal performance.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
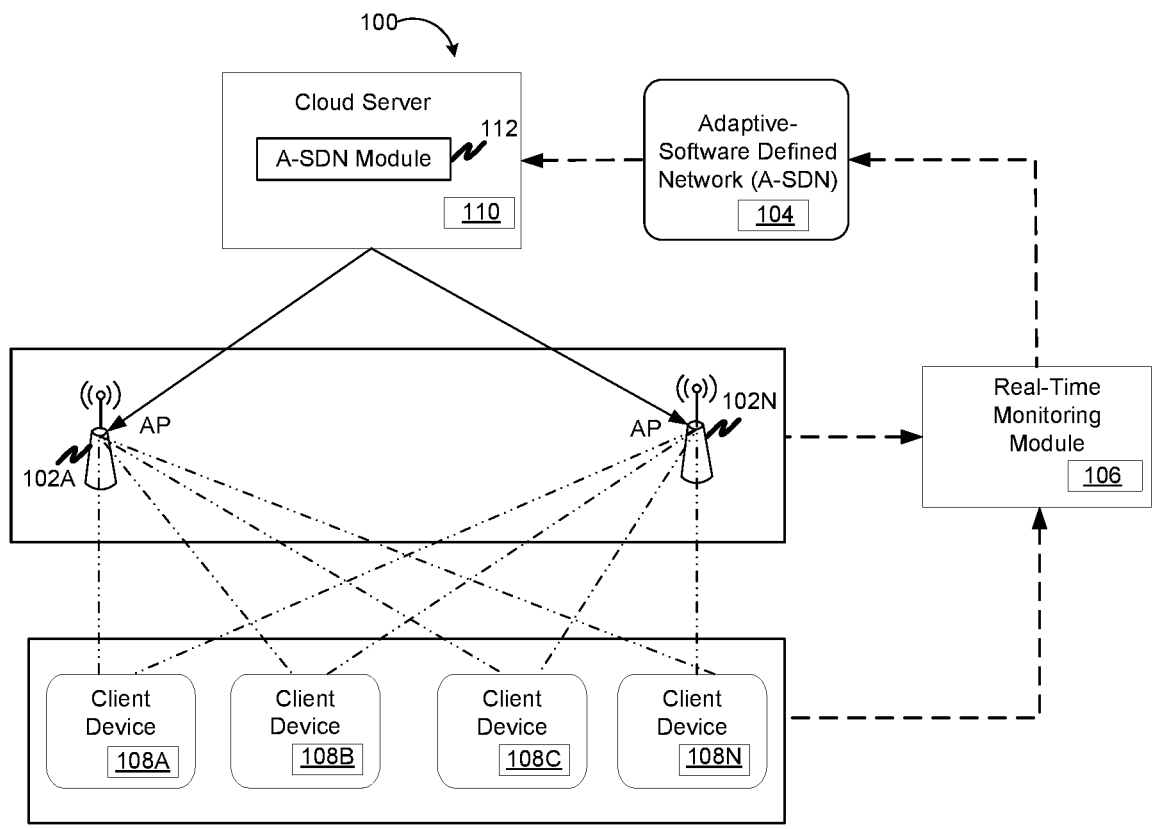
FIG. 1 illustrates a system for managing a plurality of Wi-Fi access points using an adaptive software defined network (A-SDN) in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to remotely managing and controlling the Wi-Fi access points using a cloud based adaptive software defined network (A-SDN) that involves a number of optimization paths and adaptive decision making criteria.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for managing a plurality of Wi-Fi access points using a cloud based adaptive software defined network (A-SDN). In order to manage the plurality of Wi-Fi access points, measurement data corresponding to a plurality of network variables are collected from one or more Wi-Fi access points and one or more client devices using a cloud based network application. Once the measurement data are collected, one or more optimal settings of one or more decision variables are derived for the one or more Wi-Fi access points using one or more network variables from the plurality of network variables. The one or more optimal settings are derived by formulation of optimization problems through heuristic solutions and a machine learning based optimization using the one or more network variables.

FIG. 1 illustrates a system 100 for managing a plurality of Wi-Fi access points 102A-102N using an adaptive software defined network (A-SDN) 104 in accordance with an embodiment of the invention.

As illustrated in FIG. 1, system 100 includes a real-time monitoring module 106 which is communicatively coupled to plurality of Wi-Fi access points 102A-102N, a plurality of client devices 108A-108N and a cloud server 110.

Plurality of Wi-Fi access points 102A-102N are deployed in places such as, but not limited to, homes, enterprises and public spaces. Plurality of client devices 108A-108N are user devices such as, but not limited to, a mobile device, a personal digital assistant, a computer, a laptop, a smart phone and a tablet.

Cloud server 110 includes an adaptive software defined network (A-SDN) module 112 that communicates with A-SDN 104 and acts as a centralized structure for the smart management of plurality of Wi-Fi access points 102A-102N.

In order to manage a Wi-Fi access point 102A of plurality of Wi-Fi access points 102A-102N, real-time monitoring module 106 collects measurement data corresponding to a plurality of network variables from plurality of Wi-Fi access points 102A-102N and plurality of client devices 108A-108N.

The plurality of network variables can be, but need not limited to, an access point average access delay, an average access delay for each access category, an associated client device count, a channel utilization, a transmitted fragment count, a group addressed transmitted frame count, a failed count, a retry count, a multiple retry count, a frame duplicate count, a request to send (RTS) count, an RTS failure count, an acknowledge (ACK) failure count, a received fragment count, a group addresses received frame count, a frame check sequence (FCS) error count, a transmitted frame count, a received signal strength indicator (RSSI) on a client device and a total data transfer. Further, the primary network variables include, but need not be limited to, the total data transfer, channel utilization, client device counts and RSSI on client devices. A frequency of monitoring the plurality of network variables is inversely proportional to a time constant of network dynamics.

For collecting the measurement data, real-time monitoring module 106 adapts a frequency of import of the measurement data corresponding to the plurality of network variables based on a transition profile of the plurality of network variables and environmental disturbance associated with Wi-Fi access point 102A.

The measurement data corresponding to the plurality of network variables are then fed into A-SDN module 112 and processed at variable and adaptable frequencies.

A-SDN module 112 processes the measurement data and derives the optimal settings of one or more decision variables for Wi-Fi access point 102A using the one or more network variables. The one or more decision variables can be, but need not be limited to, an RTS/CTS threshold, a fragmentation threshold, a beacon interval, a delivery traffic indication (DTI) interval, an 802.11 mode, an 802.11 protection, a transmit power, an operating channel bandwidth, channels in use, a WAN managed upstream bandwidth and LAN managed downstream bandwidth. The one or more optimal settings of the one or more decision variables are derived by formulation of optimization problems through heuristic solutions and a machine learning based optimization using the one or more network variables. In an embodiment, the optimization problem includes Mixed Integer Nonlinear Programming (MINLP) problems.

Further, A-SDN module 112 recalculates an optimal setting for Wi-Fi access point 102A in response to receiving a fault warning signal from real-time monitoring module 106. The fault warning signal represents changes in data transfer rate, changes in a network management policy and measurable and immeasurable disturbances. The changes are determined by monitoring one or more primary network variables at high frequencies. The primary network variables can be, but need not be limited to, the total data transfer, the channel utilization, the associated client device count and the RSSI on the client device. A-SDN module 112 is further described in detail in conjunction with FIG. 2.

Figure 2:
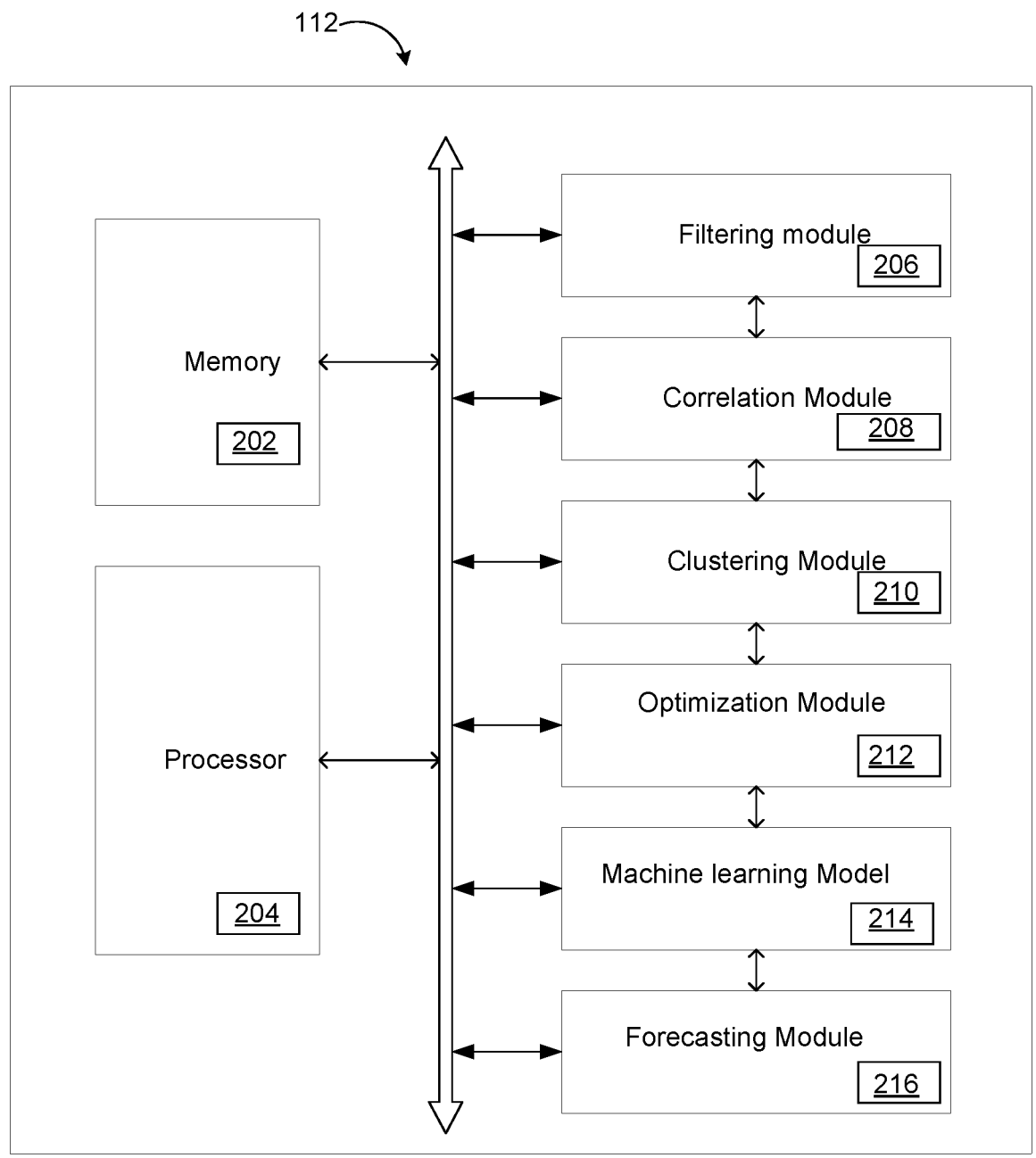
FIG. 2 illustrates an A-SDN module of a cloud server for managing a plurality of Wi-Fi access points in accordance with an embodiment of the invention.

FIG. 2 illustrates A-SDN module 112 of cloud server 110 for managing plurality of Wi-Fi access points 102A-102N in accordance with an embodiment of the invention.

As illustrated in FIG. 2, A-SDN module 112 comprises a memory 202, a processor 204 communicatively coupled to memory 202, a filtering module 206, a correlation module 208, a clustering module 210, an optimization module 212, a machine learning model 214 and a forecasting module 216. Filtering module 206, correlation module 208, clustering module 210, optimization module 212, machine learning model 214 and forecasting module 216 are communicatively coupled to memory 202 and processor 204. A-SDN module 112 stores measurement data corresponding to a plurality of network variables received from real-time monitoring module 106 in memory 202.

Filtering module 206 filters the plurality of network variables to eliminate a channel and an environmental noise. Filtering module 206 eliminates outlier measurements and extracts a representative pattern of the plurality of network variables through smoothing. The representative pattern of the plurality of network variables is then fed into correlation module 208.

Correlation module 208 decomposes the representative pattern of the plurality of network variables into a set of correlated variables and reduces a number of the plurality of network variables. Further, correlation module 208 selects a subset of correlated variables from the set of correlated variables. The subset of correlated variables are independent variables that have a relatively lower condition number of a covariance matrix. The selected subset of correlated variables is then fed into clustering module 210.

Clustering module 210 then clusters the subset of correlated variables. The subset of correlated variables is clustered based on various criteria, such as, but not limited to, a location of a network element, an access point property and a network element volatility. Also, the subset of correlated variables is clustered to speed up computations and efficient control actions required for managing plurality of Wi-Fi access points 102A-102N. Additionally, a size and structure of the clusters varies in accordance with the availability of new measurement data.

Optimization module 212 derives one or more optimal settings of the one or more decision variables for Wi-Fi access point 102A using the one or more network variables.

In order to derive the one or more optimal settings for Wi-Fi access point 102A, optimization module 212 compares a density of plurality of Wi-Fi access points 102A-102N to a threshold.

In response to determining that the density of plurality of Wi-Fi access points 102A-102N is lower than the threshold, optimization module 212 performs an optimization of interference among plurality of Wi-Fi access points 102A-102N.

In accordance with an embodiment, semi-empirical optimization of interference among plurality of Wi-Fi access points 102A-102N is performed using a semi-empirical model. The optimization is performed through formulation of an optimization problem which is solved to minimize interference among plurality of Wi-Fi access points 102A-102N. The equation representing the optimization problem is as follows:

$$\min_{AP_C, AP_I} f(AP_C, AP_I, y, t) \quad (1)$$

s.t.

$$h(AP_C, AP_I, y, t) = 0$$

$$g(AP_C, AP_I, y, t) \leq 0$$

$$AP_{I,i} \in AP_{I,i,set}, i = 1, \square, K$$

$$AP_{C,i,low} \leq AP_{C,i} \leq AP_{C,i,high} \; i = 1, \square, M$$

wherein, '$AP_C$' is a vector (dimension M) of the continuous manipulated subset of Wi-Fi access point variables that include a request to send (RTS) threshold or a clear to send (CTS) threshold, transmission power of access points, and '$AP_{C,i,high}$' and '$AP_{C,i,low}$' represent high and low bounds on $i^{th}$ continuous manipulated subset of Wi-Fi access point variables. As illustrated in Equation 1, '$AP_I$' is a vector (dimension N) of integer Wi-Fi access point variables that includes a channel number and '$AP_{I,i}$' represents $i^{th}$ discrete Wi-Fi access point variable and '$AP_{I,i,set}$' represents a set of possible discrete values for the $i^{th}$ Wi-Fi access point variable. Further, 't' indicates time, 'h' and 'g' represent vector of equality constraints and inequality constraints respectively and 'f' is an objective function that uses the semi-empirical model and returns a performance index.

A specific form of this optimization problem can be written as follows:

$$\min_{AP_I} \sum_{1 \leq j < i \leq N}^{N} I(AP_{I,i}, AP_{I,j})$$

s.t.

$$h(AP_I, y, t) = 0$$

$$g(AP_I, y, t) \leq 0$$

$$AP_{I,i} \in AP_{I,i,set}, i = 1, \ldots, K$$

Further, $I(AP_{I,i}, AP_{I,j})$ provided in Equation 1 represents an interference matrix that is calculated using the following equation:

$$I(AP_{I,i}, AP_{I,j}) = RSSI_{APs-APs}(i,j) \times O(AP_{I,i}, AP_{I,j}) \quad (2)$$

wherein, '$RSSI_{APs-APs}(i,j)$' represents the RSSI of $j^{th}$ Wi-Fi access point on $i^{th}$ Wi-Fi access point and $O(AP_{I,i}, AP_{I,j})$ is the overlapping coefficient that is calculated from a fractional bandwidth overlap between occupied channels of $i^{th}$ Wi-Fi access point and occupied channels of $j^{th}$ Wi-Fi access point. Further, $O(AP_{I,i}, AP_{I,j})$ is independent of a network structure and becomes zero for non-overlapping channels. For example, $O(AP_{I,i}, AP_{I,j})$ includes channels both from 2.4 GHz and 5 GHz band. Thus, the interference matrix is calculated using RSSI measurements of plurality of Wi-Fi access points 102A-102N and channels of plurality of Wi-Fi access points 102A-102N.

The optimization problem as illustrated in Equation 1 is formulated using the one or more decision variables, the network measurements ($AP_C$, $AP_I$), the set of equality constraints (h and g), the objective function (f) that uses the semi-empirical model and the interference matrix $O(AP_{I,i}, AP_{I,j})$. Further, branch and bound algorithms that are capable of handling optimization problem results in evaluation of the one or more decision variables.

In an example solution for the optimization problem in accordance with Equation 1, $AP_C$ includes transmission power and the RTS/CTS threshold, $AP_I$ includes an operating channel bandwidth, channels in use and 802.11 mode.

In some cases, an optimal solution for the optimization problem or a satisfactory sub-optimum solution for the optimization problem is derived using only the one or more decision variables, thus, resulting in reduction of computation time. For instance, when plurality of Wi-Fi access points 102A-102N are geographically distinct, a power level adjustment solely serves as the optimal solution for minimizing the interference among plurality of Wi-Fi access points 102A-102N without requiring any further adjustments in channel selection.

In addition, the formulation for the optimization problem illustrated in Equation 1 is also applicable when external wireless local area networks (WLANs) act as source of disturbance and the formulation adjusts the settings of plurality of Wi-Fi access points 102A-102N for an optimal performance. Therefore, minimizing the interference among plurality of Wi-Fi access points 102A-102N is operationally desired when the density of plurality of Wi-Fi access points 102A-102N is low and a solution of Equation 1 provides a satisfactory optimal solution for the optimization problem despite various data demand profiles.

Moving on, in response to determining that the density of plurality of Wi-Fi access points 102A-102N is greater than the threshold, optimization module 212 performs an optimization of machine learning model 214 and an optimization of data rate associated with plurality of Wi-Fi access points 102A-102N using machine learning model 214.

Machine learning model 214 includes the one or more decision variables that are satisfactory to deliver significant transitions in deriving the one or more optimal settings for Wi-Fi access point 102A. Also, machine learning model 214 performs pattern recognition of network elements required for formulating the optimization problem.

In order to perform optimization of machine learning model 214, optimization module 212 determines a performance of machine learning model 214. Based on the performance of machine learning model 214, optimization module 212 updates machine learning model 214. After updating machine learning model 214, optimization module 212 enables forecasting module 216 to forecast network dynamics. The network dynamics are forecasted when a real-time data transfer is feasible and predictions include faster transitions. Also, forecasting module 216 calculates an average data demand profile with less and periodic measurements based on the network dynamics and further creates a statistical database for future predictions. Thus, the optimization of machine learning model 214 is performed by using the forecasted network dynamics that include the data demand profile.

Moving on, in order to perform the optimization of data rate, optimization module 212 uses machine learning model 214 to formulate the optimization problem that is solved to minimize interference among plurality of Wi-Fi access points 102A-102N based on data transmitted from plurality of Wi-Fi access points 102A-102N.

The optimization problem that is solved to minimize interference among plurality of Wi-Fi access points 102A-

102N where non-overlapping channels are scarce. The optimization problem of equation 1 is then transformed into the following equation:

$$\underset{AP_C, AP_I}{\text{Min}} \sum_{t=1}^{t_N} \sum_{i=1}^{N} \sum_{j=1}^{STA_I} (DR(AP_C, AP_I, i, j, t) - D(AP_C, AP_I, i, j, t))^2 \quad (3)$$

s.t.

$h(AP_C, AP_I, y, t) = 0$ $g(AP_C, AP_I, y, t) \leq 0$ $DR(AP_C, AP_I, i, j, t) \geq D(AP_C, AP_I, i, j, t)$ $AP_{I,i} \in AP_{I,i,set}, i = 1, \square, K$ $AP_{C,i,low} \leq AP_{C,i} \leq AP_{C,i,high} \; i = 1, \square, M$ wherein, '$STA_i$' indicates number of client devices connected to $i^{th}$ Wi-Fi access point, $DR(AP_C, AP_I, i, j, t)$ is a data rate enabled from $i^{th}$ Wi-Fi access point to $j^{th}$ client device for $AP_C$ and $AP_I$ decision variables, and $D(AP_C, AP_I, i, j, t)$ is a data demand that includes uncertainty considerations of $j^{th}$ client device from $i^{th}$ Wi-Fi access point for $AP_C$ and $AP_I$ decision variables.

Calculation of the data rate $DR(AP_C, AP_I, i, j, t)$ requires data on the interactions of the network elements. The calculation of data rate is handled by a RSSI matrix in order to calculate a signal-to-interference-plus-noise ratio (SINR) that determines a modulation based on a type of Wi-Fi access point 102A. The RSSI matrix in equation 1 is further extended to include plurality of client devices 108A-108N and the RSSI matrix with plurality of client devices 108A-108N is represented by equation 4:

$$RSSI = \begin{bmatrix} RSSI_{APs-APs} & RSSI_{APs-STAs} \\ RSSI_{STAs-APs} & RSSI_{STAs-STAs} \end{bmatrix} \quad (4)$$

wherein, '$RSSI_{Aps-Aps}$' is an RSSI matrix that determines an extent of interference between plurality of Wi-Fi access points 102A-102N, '$RSSI_{STAs-APs}$' is an RSSI matrix that determines an extent of interference between plurality of Wi-Fi access points 102A-102N and plurality of client devices 108A-108N, '$RSSI_{STAs-STAs}$' is an RSSI matrix that determines an extent of interference from other Wi-Fi access points 102B-102N on a particular client device 108A of plurality of client devices 108A-108N and '$RSSI_{STAs-STAs}$' matrix is used when uploading and hidden node issue become an important concern.

The optimization problem as illustrated in Equation 3 is formulated by using the data rate $DR(AP_C, AP_I, i, j, t)$ from Wi-Fi access point 102A to client device 108A, the data demand $D(AP_C, AP_I, i, j, t)$ including uncertainty considerations of the network from client device 108A to Wi-Fi access point 102A, data demand forecasts that are obtained from forecasting module 216 and an objective function that takes consumption of resources into account by minimizing the difference between the data rate and the data demand instead of maximizing the data rate itself. Therefore, the optimization results in an efficient use of resources in addition to satisfying the needs of the network.

In accordance with an embodiment, Equation 3 considers a dynamic horizon making use of future data demand forecasts. Once the demand forecast is available, a reliable and adaptive horizon of objective minimization is derived from Equation 3. Thus, in addition to current network conditions, future dynamics of the network is included for enabling the probability of successful transmission attempts in the overall horizon and reducing the frequency of the control actions required for managing plurality of Wi-Fi access points 102A-102N. The frequency of the control actions is adaptive as the frequency is a function of network dynamics and cloud computation limitations.

Further, the objective function represented in Equation 2, enables efficient use of channels and energy. Thus, energy consumption is reduced by supplying minimum amount of energy that delivers the desired data rate in discrete signal-to-noise ratio to data rate relationship due to modulation structure determined for the corresponding type of Wi-Fi access point 102A.

Real-time optimization on the data rate is very critical when plurality of Wi-Fi access points 102A-102N are dense. In order to illustrate real-time optimization on the data rate, Wi-Fi access points that include only 802.11 protocol are considered. Also, the one or more decision variables used for formulation of the optimization problem are limited to channels in use. Further, channels and an identifier (ID) associated with the Wi-Fi access points are determined and an ID associated with client devices and throughput received by the client devices from the Wi-Fi access points are determined. After determining the channels and the ID, optimization on the data rate is performed by using an objective function that minimizes an interference among the Wi-Fi access points and maximizes the data rate. The objective function includes only the RSSI matrix that determines an extent of interference between the Wi-Fi access points.

After performing optimization, optimization module 212 performs an uncertainty evaluation of a network from client device 108A to derive the one or more optimal settings for Wi-Fi access point 102A. For example, the uncertainty evaluation may be a sudden connection loss due to a channel switch. Thus, the one or more optimal settings of the decision variables for Wi-Fi access point 102A using the one or more network variables, allow Wi-Fi access point 102A to operate at real-time optimal performance.

Figure 3:
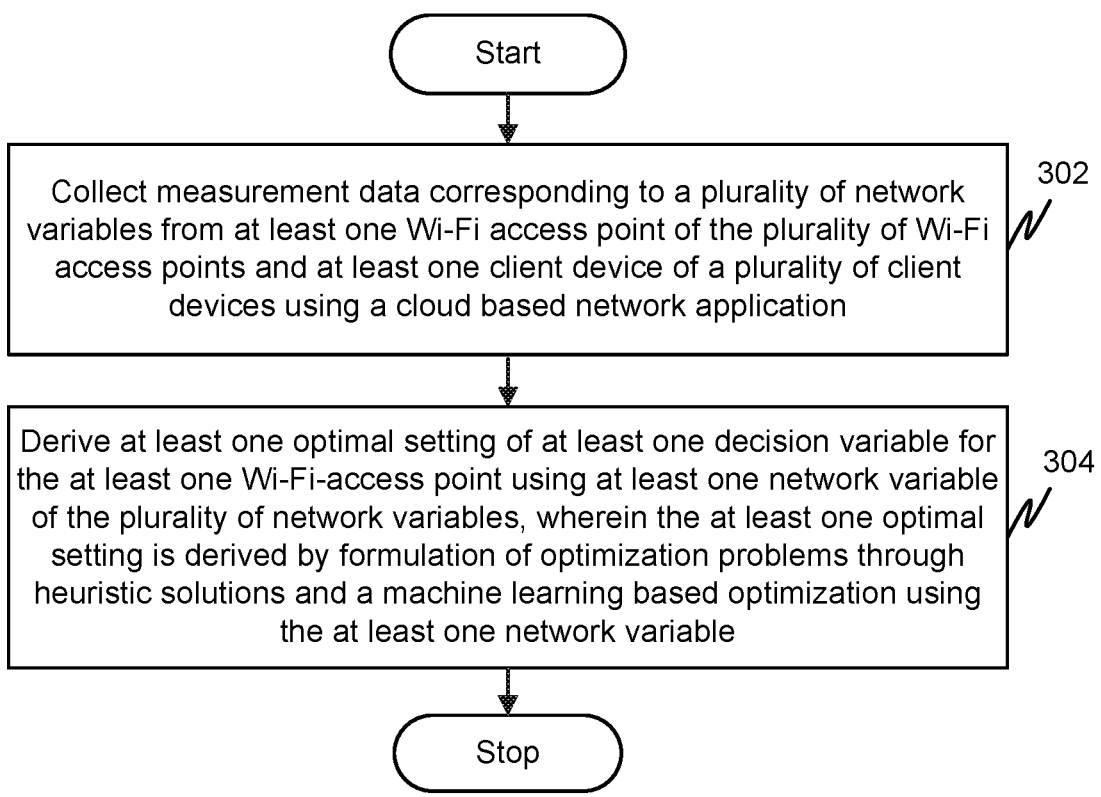
FIG. 3 illustrates a flowchart of a method for managing a plurality of Wi-Fi access points using an A-SDN in accordance with an embodiment of the invention.

FIG. 3 illustrates a flowchart of a method for managing plurality of Wi-Fi access points 102A-102N using A-SDN 104 in accordance with an embodiment of the invention.

At step 302, measurement data corresponding to plurality of network variables are collected by real-time monitoring module 106 from plurality of Wi-Fi access points 102A-102N and plurality of client devices 108A-108N using a cloud based network application. Step 302 is further described in detail in conjunction with FIG. 4.

At step 304, one or more optimal settings of one or more decision variables for Wi-Fi access point 102A are derived using one or more network variables of the plurality of network variables. The one or more optimal settings are derived by formulation of optimization problems through heuristic solutions and a machine learning based optimization using the one or more network variables. Step 304 is further described in detail in conjunction with FIG. 5.

Figure 4:
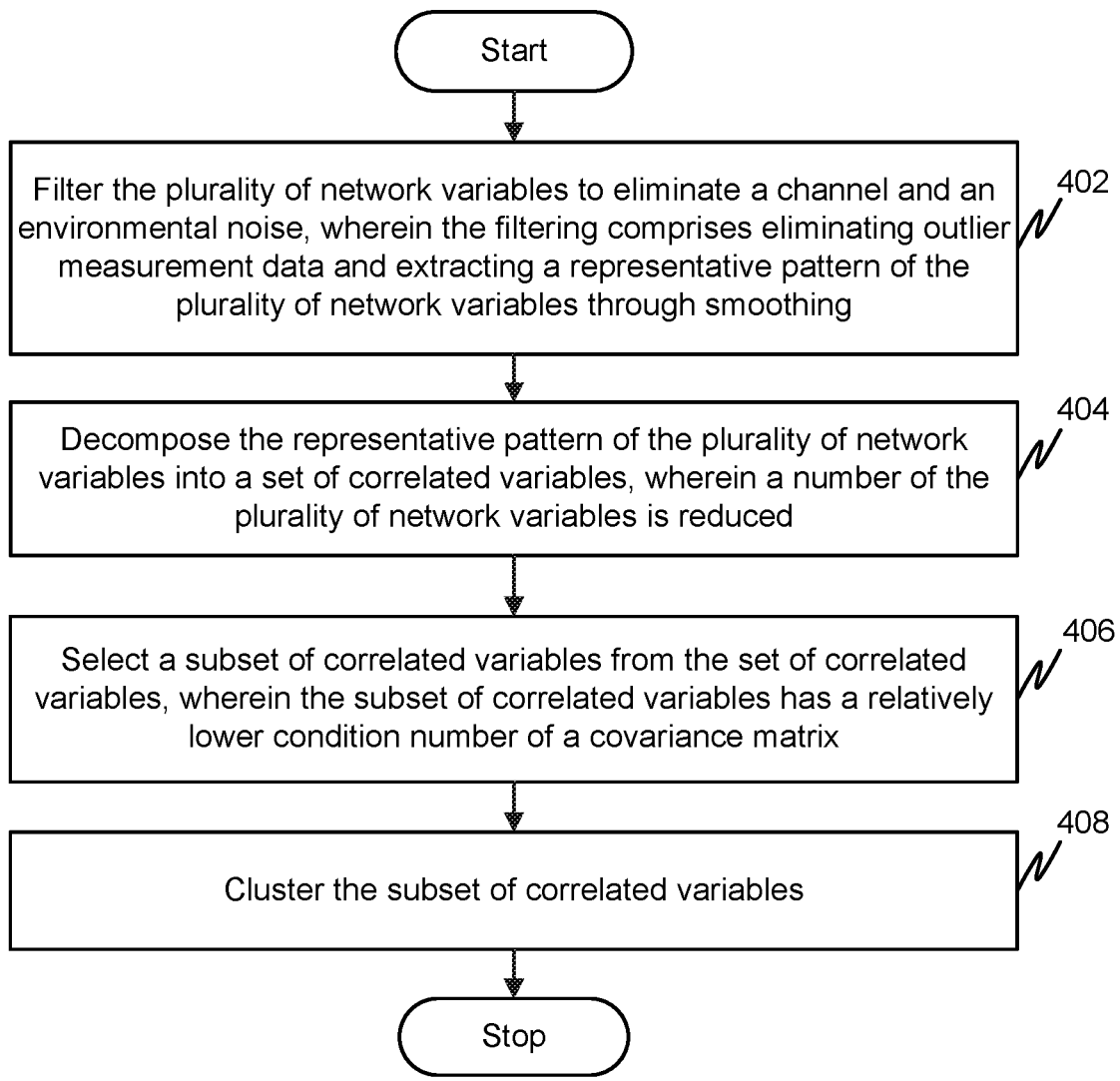
FIG. 4 illustrates a flowchart of a method for collecting measurement data corresponding to a plurality of network variables from a plurality of Wi-Fi access points and a plurality of client devices in accordance with an embodiment of the invention.

FIG. 4 illustrates a flowchart of a method for collecting measurement data corresponding to the plurality of network variables collected from plurality of Wi-Fi access points 102A-102N and plurality of client devices 108A-108N in accordance with an embodiment of the invention.

At step 402, the plurality of network variables are filtered using filtering module 206 to eliminate a channel and an environmental noise. The step of filtering eliminates outlier measurement data and extracts a representative pattern of the plurality of network variables through smoothing.

After extracting the representative pattern, at step 404, the representative pattern of the plurality of network variables is decomposed into a set of correlated variables in correlation module 208. Thus, a number of the plurality of network variables is reduced.

At step 406, a subset of correlated variables is then selected from the set of correlated variables using correlation module 208. The subset of correlated variables has a relatively lower condition number of a covariance matrix. Thereafter, at step 408, the subset of correlated variables is clustered using clustering module 210.

Figure 5:
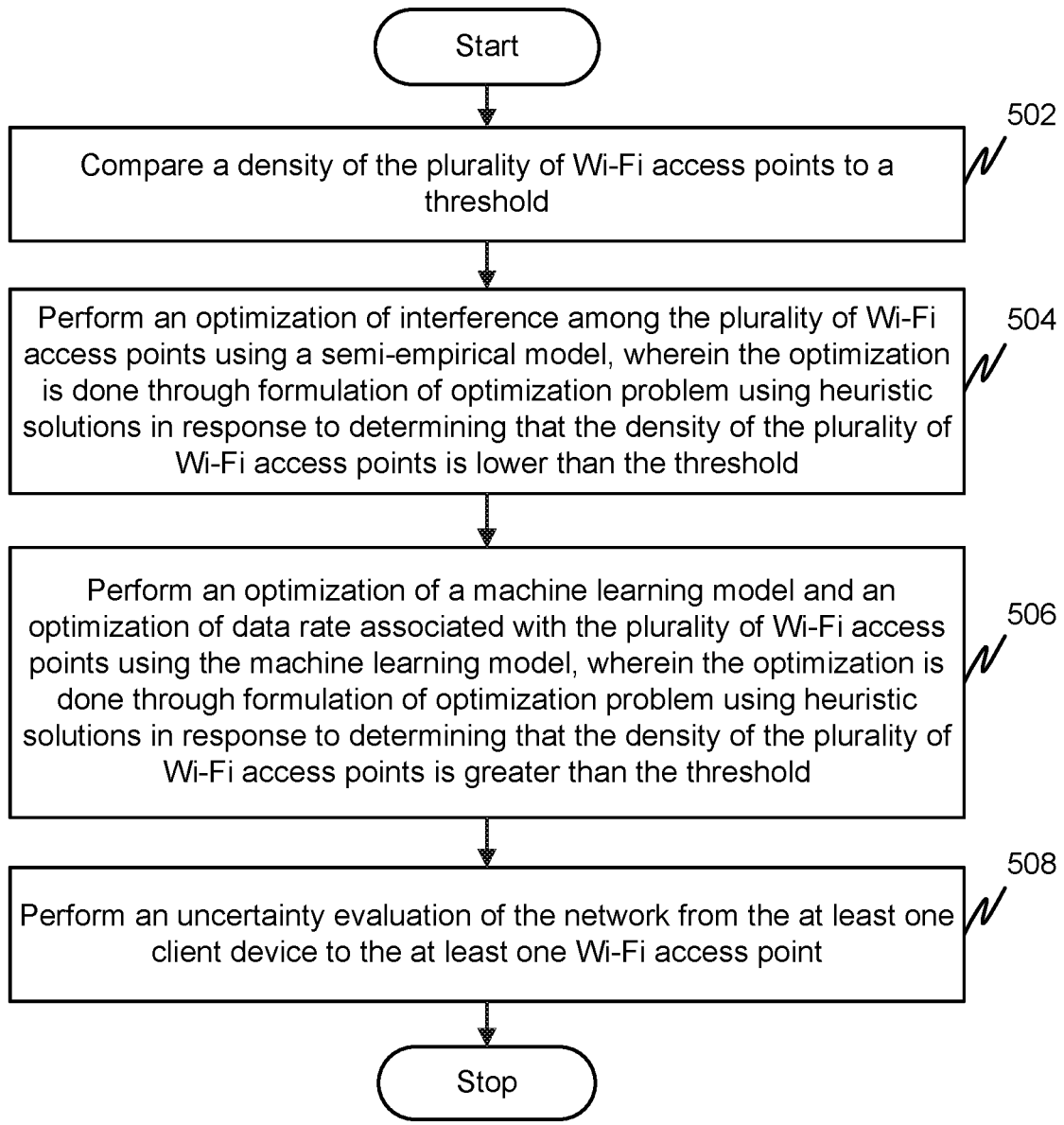
FIG. 5 illustrates a flowchart of a method for deriving one or more optimal settings for a Wi-Fi access point in accordance with an embodiment of the invention.

FIG. 5 illustrates a flowchart of a method for deriving one or more optimal settings of one or more decision variables for Wi-Fi access point 102A in accordance with an embodiment of the invention.

At step 502, a density of plurality of Wi-Fi access points 102A-102N is compared to a threshold using optimization module 212. In response to determining that the density of plurality of Wi-Fi access points 102A-102N is lower than the threshold, at step 504, an optimization of interference is performed among plurality of Wi-Fi access points 102A-102N using optimization module 212. In accordance with an embodiment, semi-empirical optimization of interference among plurality of Wi-Fi access points 102A-102N is performed using a semi-empirical model. The optimization is performed through formulation of optimization problem using heuristic solutions.

In response to determining that the density of plurality of Wi-Fi access points 102A-102N is greater than the threshold, at step 506, an optimization of machine learning model 214 is performed by optimization module 212 and further an optimization of data rate associated with plurality of Wi-Fi access points 102A-102N is performed by optimization module 212 using machine learning model 214. The optimization is performed through formulation of optimization problem using heuristic solutions. Step 506 is further described in detail in conjunction with FIG. 6.

After performing the optimization, at step 508, an uncertainty evaluation of a network from client device 108A to Wi-Fi access point 102A is performed.

Figure 6:
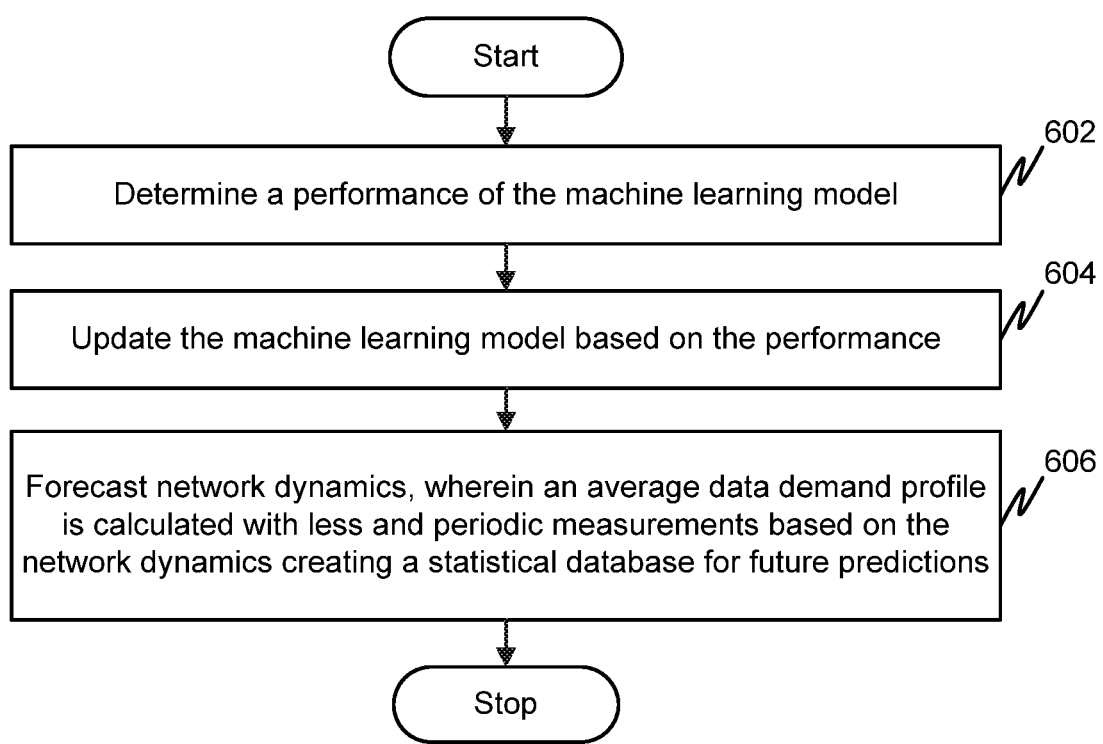
FIG. 6 illustrates a flowchart of a method for performing an optimization of a machine learning model in accordance with an embodiment of the invention.

FIG. 6 illustrates a flowchart of a method for performing an optimization of machine learning model 214 in accordance with an embodiment of the invention.

At step 602, a performance of machine learning model 214 is determined using optimization module 212. At step 604, machine learning model 214 is then updated based on the performance using optimization module 212.

Thereafter, at step 606, network dynamics are forecasted using forecasting module 216, wherein, based on the network dynamics, average data demand profile is calculated with less and periodic measurements and a statistical database is created for future predictions.

Figure 7:
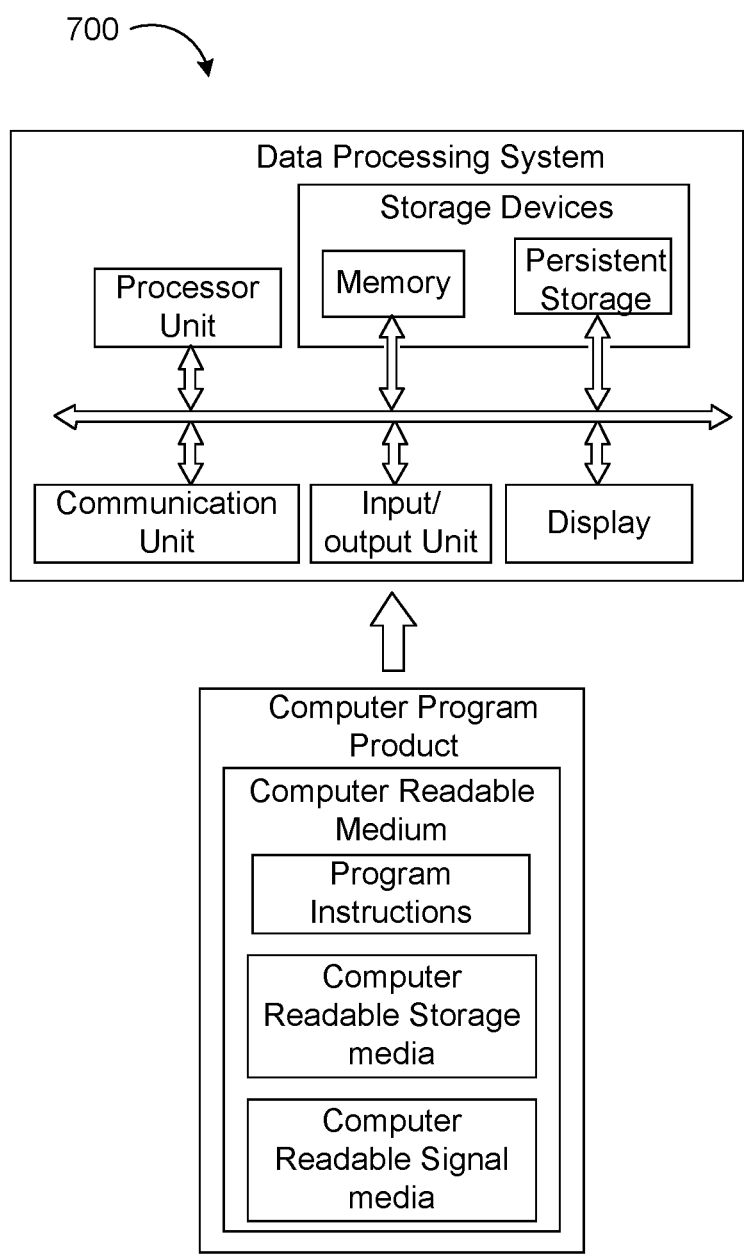
FIG. 7 illustrates a computer program product for managing a plurality of Wi-Fi access points using an A-SDN in accordance with an embodiment of the invention.

FIG. 7 illustrates a computer program product for automatically managing plurality of Wi-Fi access points 102A-102N using A-SDN 104 in accordance with an embodiment of the invention.

An embodiment of the present invention may relate to computer program product 700 with a non-transitory computer readable medium having program instructions thereon for performing various computer-implemented operations of the method and/or system disclosed herein. The computer readable storage media and program instructions may be those specially designed and constructed for the purposes of the method and/or system disclosed herein, or, they may be of the kind well known and available to those having skill in the computer software arts. Examples of the computer-readable storage media include, but are not limited to, magnetic media, optical media, magneto-optical media and hardware devices that are specially configured to store and execute program instructions. Examples of the program instructions include machine code, such as produced by a compiler, and files containing higher-level code that are executed by a computer using an interpreter. For example, an embodiment of the present invention may be implemented using JAVA®, C++, or other object-oriented programming language and development tools. Aspects of the present invention may also be implemented using Hypertext Transport Protocol (HTTP), Procedural Scripting Languages and the like.

The invention utilizes an adaptive software defined network (A-SDN) algorithm for remote management and control of Wi-Fi access points through cloud based mechanisms that include filtering, data mining, clustering, machine learning and dynamic optimization.

The A-SDN acts as a centralized layer that captures improvement direction and optimal settings for the Wi-Fi access points based on online measurements, data transaction demand and forecasts, network capabilities, uncertainties and disturbances in a Wi-Fi network. The optimal settings are derived for the Wi-Fi access points through heuristic solution of a Mixed Integer Nonlinear Programming (MINLP) and a machine learning based optimization. Thus, optimization results in reduced power consumption, increased throughput and improved data traffic management.

Further, the A-SDN utilizes a semi-empirical model and a machine learning model for optimizing overall performance of the Wi-Fi access points. The A-SDN utilizes the machine learning model that is derived from data mining techniques on network variables both at nominal operating conditions and perturbed operating conditions for determining the impact of a setting associated with the network variables for the Wi-Fi access points. The A-SDN utilizes the semi-empirical model for applications that require extrapolation capability considerations.

Moreover, the A-SDN initiates a re-optimization process by determining the changes in data transfer rates, network management policy and measurable and immeasurable disturbances in addition to reducing the data transfer cycle. Thus, the Wi-Fi access points are enabled to operate at real-time optimal performance.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for managing a plurality of Wi-Fi access points using a cloud based adaptive software defined network (A-SDN), the method comprising:
   collecting, by one or more processors, measurement data corresponding to a plurality of network variables from at least one Wi-Fi access point of the plurality of Wi-Fi access points and at least one client device of a plurality of client devices using a cloud based network application;
   deriving, by one or more processors, at least one optimal setting of at least one decision variable for the at least one Wi-Fi-access point using at least one network variable of the plurality of network variables, wherein the at least one optimal setting is derived by formulation of optimization problems through heuristic solutions and a machine learning based optimization using the at least one network variable;
   wherein deriving the at least one optimal setting of the at least one decision variable for the at least one Wi-Fi access point comprises:
   comparing, by one or more processors, a density of the plurality of Wi-Fi access points to a threshold;
   in response to determining that the density of the plurality of Wi-Fi access points is lower than the threshold, performing, by one or more processors, an optimization of an interference among the plurality of Wi-Fi access points using a semi-empirical model, wherein the optimization is performed through formulation of an optimization problem using heuristic solutions;
   in response to determining that the density of the plurality of Wi-Fi access points is greater than the threshold, performing, by one or more processors, an optimization of a machine learning model and an optimization of a data rate associated with the plurality of Wi-Fi access points using the machine learning model, wherein the optimization is performed through formulation of the optimization problem using heuristic solutions; and
   performing, by one or more processors, an uncertainty evaluation of the cloud based adaptive software defined network from the at least one client device to the at least one Wi-Fi access point.

2. The method according to claim 1, wherein collecting the measurement data comprises adapting, by one or more processors, a frequency of import of the measurement data corresponding to the plurality of network variables based on a transition profile of the plurality of network variables and an environmental disturbance associated with the plurality of Wi-Fi access points.

3. The method according to claim 1, wherein collecting the measurement data further comprises:
   filtering, by one or more processors, the plurality of network variables to eliminate a channel and an environmental noise, wherein the filtering comprises eliminating outlier measurement data and extracting a representative pattern of the plurality of network variables through smoothing;
   decomposing, by one or more processors, the representative pattern of the plurality of network variables into correlated variables, wherein a number of the plurality of network variables is reduced;
   selecting, by one or more processors, a set of the correlated variables, wherein the set of correlated variables has a relatively lower condition number of a covariance matrix; and
   clustering, by one or more processors, the set of correlated variables.

4. The method according to claim 3, wherein the set of correlated variables is clustered based on at least one of a location of a network element, an access point property, or a network element volatility.

5. The method according to claim 1, wherein a network variable of the plurality of network variables comprises one of an access point average access delay, an average access delay for each access category, a client device count, a channel utilization, a transmitted fragment count, a group addressed transmitted frame count, a failed count, a retry count, a multiple retry count, a frame duplicate count, a request to send (RTS) count, an RTS failure count, an acknowledge (ACK) failure count, a received fragment count, a group address received frame count, a frame check sequence (FCS) error count, a transmitted frame count, a received signal strength (RSSI) on a client device, or a total data transfer.

6. The method according to claim 1, wherein a decision variable comprises one of an RTS/CTS threshold, a fragmentation threshold, a beacon interval, a delivery traffic indication (DTI) interval, an 802.11 mode, an 802.11 protection, a transmit power, an operating channel bandwidth, a number of channels in use, a WAN managed upstream bandwidth, or a LAN managed downstream bandwidth.

7. The method according to claim 1, wherein performing optimization of the interference among the plurality of Wi-Fi access points comprises:
   performing, by one or more processors, a semi-empirical optimization among the plurality of Wi-Fi access points through formulation of an optimization problem solved to minimize the interference among the plurality of Wi-Fi access points, wherein the optimization problem is formulated using the plurality of decision variables, network measurements, a set of equality constraints, an objective function using the semi-empirical model and an interference matrix.

8. The method according to claim 7, wherein the interference matrix is calculated using RSSI measurements of the plurality of Wi-Fi access points and channels of the plurality of the Wi-Fi access points.

9. The method according to claim 1, wherein performing the optimization of the machine learning model comprises:
   determining, by one or more processors, a performance of the machine learning model;
   updating, by one or more processors, the machine learning model based on the performance; and
   forecasting, by one or more processors, network dynamics, wherein an average data demand profile is calculated based on the network dynamics to create a statistical database for future predictions.

10. The method according to claim 1, wherein performing optimization of the data rate associated with the plurality of Wi-Fi access points comprises:
    formulating, by one or more processors, the optimization problem to minimize the interference among the plurality of Wi-Fi access points based on data transmitted from the plurality of Wi-Fi access points, wherein the optimization problem is formulated using the data rate from the at least one Wi-Fi access point to the at least one client device, data demand including uncertainty considerations of the cloud based adaptive software defined network from the at least one client device to the at least one Wi-Fi access point, data demand forecasts, and an objective function accounting for consumption of resources by minimizing a difference between the data rate and the data demand instead of maximizing the data rate.

11. The method according to claim 10, wherein the data rate is calculated using an interaction between network elements, an RSSI matrix for the plurality of Wi-Fi access points, and an RSSI matrix for the plurality of client devices, wherein each RSSI matrix is used to calculate a signal-to-interference-plus-noise ratio (SINR) determining a modulation based on each type of Wi-Fi access point.

12. The method according to claim 1, wherein the optimization problem comprises a Mixed Integer Nonlinear Programming (MINLP) problem.

13. The method according to claim 1, further comprising recalculating, by one or more processors, an optimal setting for the at least one Wi-Fi access point based on one of changes in a data transfer rate, changes in a network management policy, measurable disturbances, or immeasurable disturbances.

14. A system for managing a plurality of Wi-Fi access points using a cloud based adaptive software defined network (A-SDN), the system comprising:
a memory;
a processor communicatively coupled to the memory, wherein the processor is configured to:
collect measurement data corresponding to a plurality of network variables from at least one Wi-Fi access point of the plurality of Wi-Fi access points and at least one client device of a plurality of client devices using a cloud based network application;
derive at least one optimal setting of at least one decision variable for the at least one Wi-Fi-access point using at least one network variable of the plurality of network variables, wherein the at least one optimal setting is derived by formulation of optimization problems through heuristic solutions and a machine learning based optimization using the at least one network variable;
filter the plurality of network variables to eliminate a channel and an environmental noise, wherein the filtering comprises eliminating outlier measurement data and extracting a representative pattern of the plurality of network variables through smoothing;
decompose the representative pattern of the plurality of network variables into correlated variables, wherein a number of the plurality of network variables is reduced;
select a set of the correlated variables, wherein the set of correlated variables has a relatively lower condition number of a covariance matrix; and
cluster the set of correlated variables.

15. The system according to claim 14, wherein the processor is further configured to:
compare a density of the plurality of Wi-Fi access points to a threshold;
in response to determining that the density of the plurality of Wi-Fi access points is lower than the threshold, perform an optimization of an interference among the plurality of Wi-Fi access points using a semi-empirical model, wherein the optimization is performed through formulation of an optimization problem using heuristic solutions;
in response to determining that the density of the plurality of Wi-Fi access points is greater than the threshold, perform an optimization of a machine learning model and an optimization of a data rate associated with the plurality of Wi-Fi access points using the machine learning model, wherein the optimization is performed through formulation of the optimization problem using heuristic solutions; and
perform an uncertainty evaluation of the cloud based adaptive software defined network from the at least one client device to the at least one Wi-Fi access point.

16. The system according to claim 15, wherein the processor is further configured to:
perform a semi-empirical optimization among the plurality of Wi-Fi access points through formulation of the optimization problem solved to minimize the interference among the plurality of Wi-Fi access points, wherein the optimization problem is formulated using the plurality of decision variables, network measurements, a set of equality constraints, and an objective function using the semi-empirical model and an interference matrix.

17. The system according to claim 15, wherein the processor is further configured to:
determine a performance of the machine learning model;
update the machine learning model based on the performance; and
forecast network dynamics, wherein an average data demand profile is calculated based on the network dynamics to create a statistical database for future predictions.

18. The system according to claim 15, wherein the processor is configured to:
formulate the optimization problem to minimize the interference among the plurality of Wi-Fi access points based on data transmitted from the plurality of Wi-Fi access points, wherein the optimization problem is formulated using the data rate from at least one Wi-Fi access point to at least one client device, data demand including the uncertainty of the cloud based adaptive software defined network from the at least one client device to the at least one Wi-Fi access point, data demand forecasts, and an objective function accounting for consumption of resources by minimizing a difference between the data rate and the data demand instead of maximizing the data rate.

* * * * *